(No Model.) 2 Sheets—Sheet 1.
R. W. ALLEN.
HILLING AND FERTILIZING MACHINE.
No. 274,542. Patented Mar. 27, 1883.
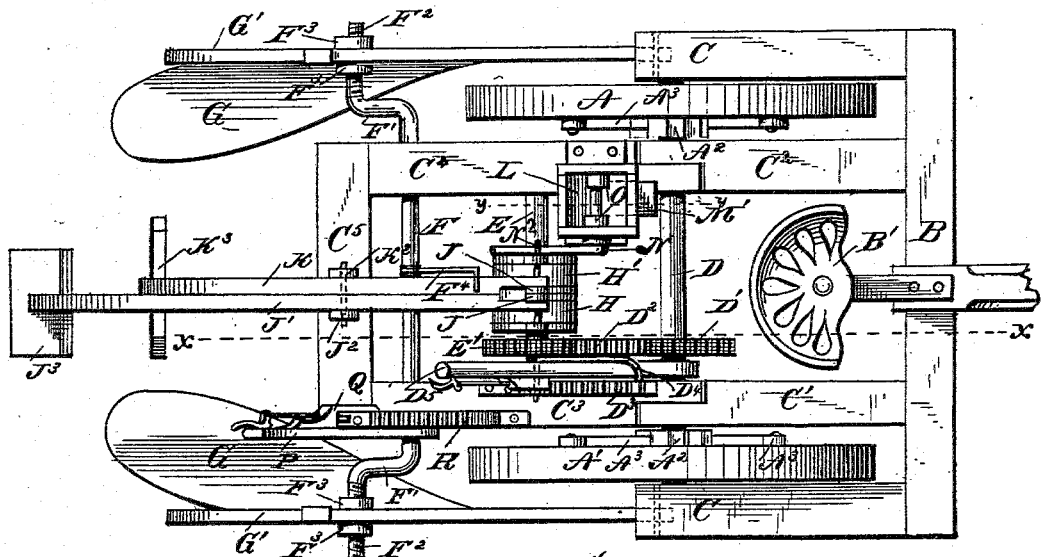
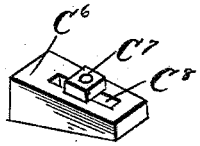
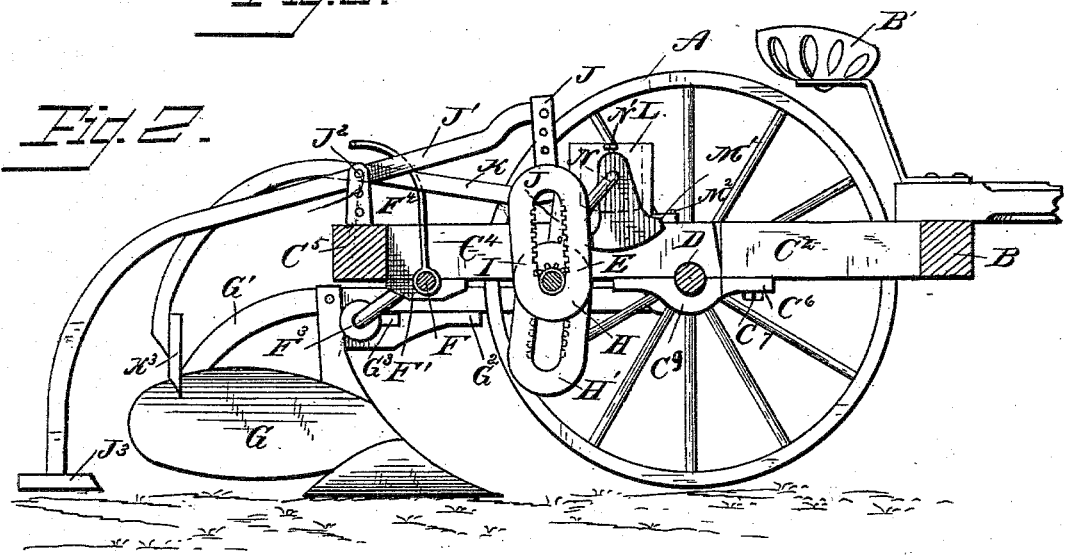
Witnesses:
Franck L. Ourand
Wm L. Speiden
Inventor:
Robert W. Allen
By Frank A. Fouts
Attorney.

(No Model.) 2 Sheets—Sheet 2.
R. W. ALLEN.
HILLING AND FERTILIZING MACHINE.
No. 274,542. Patented Mar. 27, 1883.
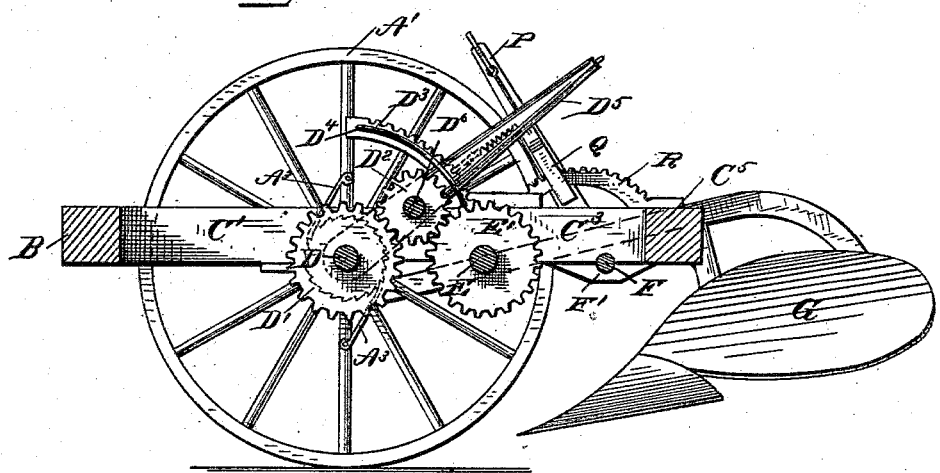
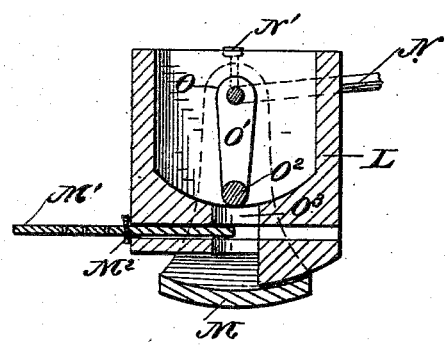
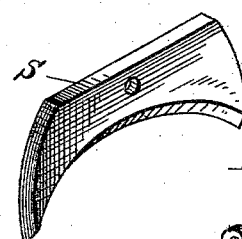
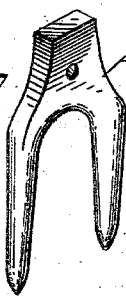
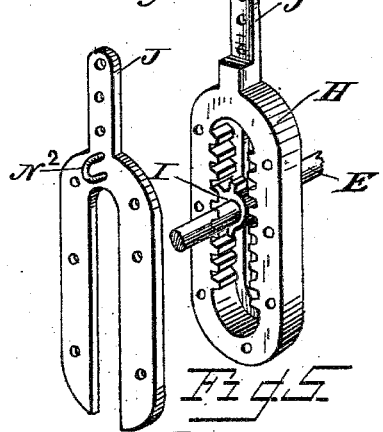
Witnesses.
Franck L. Ourand
Wm L. Speiden
Inventor:
Robert W. Allen.
By Frank A. Fouts,
Attorney.

UNITED STATES PATENT OFFICE.

ROBERT W. ALLEN, OF NELLY'S FORD, VIRGINIA.

HILLING AND FERTILIZING MACHINE.

SPECIFICATION forming part of Letters Patent No. 274,542, dated March 27, 1883.

Application filed July 15, 1882. (No model.)

*To all whom it may concern:*

Be it known that I, ROBERT W. ALLEN, a citizen of the United States of America, residing at Nelly's Ford, in the county of Nelson and State of Virginia, have invented certain new and useful Improvements in Gang-Plows, of which the following is a specification, reference being had therein to the accompanying drawings.

My invention relates to hilling and fertilizing machines; and it consists in the parts which will be hereinafter described, and pointed out in the claims.

My invention has for its object the cultivation of tobacco or other crops in which hilling or siding of the soil is desired. I provide my invention with a fertilizer attachment, which is so arranged that the fertilizer can be either drilled or dropped.

In the accompanying drawings, Figure 1 represents a plan view of the machine. Fig. 2 indicates a section through the dotted lines $x\,x$ of Fig. 1. This view shows the parts to the left of the line. Fig. 3 also represents a section through the line $x\,x$ of Fig. 1. This view shows the parts on the right of the line. Fig. 4 is a longitudinal section through the hopper, taken on the line $y\,y$ of Fig. 1. Fig. 5 is a detail of the rack-bar, its face-plate, and the mutilated pinion keyed to the central cross-piece. Fig. 6 is also a detail, showing a slotted adjustable block. This block is secured on the rear under side of the frame. Figs. 7 and 8 are different forms of hoes, which I desire to attach to the backward-projecting operating-handles.

Similar letters refer to similar parts throughout the several views.

The letter A represents the left-hand wheel, and A' the right-hand wheel.

$A^2$ is a ratchet-wheel keyed to the main shaft, and $A^3$ are pawls fixed to the inner sides of the wheels and engaging the teeth of the ratchet. When the wheels are moved forward the pawls engage the ratchet and impart motion to the main shaft, and thence to the main cog-wheel, which is keyed on said shaft. When the machine is moved back the pawls are disengaged from the ratchets, so that no power is communicated to the operating parts.

B is a cross-piece constituting the forward end of the frame.

C C are the outside pieces of the frame.

C' is the right-hand inner frame-piece, and $C^2$ the corresponding piece of the frame on the opposite side.

$C^3$ and $C^4$ are rear side pieces, and $C^5$ the back cross-piece of the frame. The frame is made in two parts. The connecting parts are united near the center and secured by the main shaft, which passes through the lapped ends of the frame—that is to say, the frame is hinged over the main shaft—the frame being provided with bearing-boxes $C^9$, fixed immediately under the frame-hinge.

$C^6$ is a V-shaped slotted block, secured to the under side of frame C' $C^2$. $C^7$ is a nut and bolt, and $C^8$ a slot. When the connecting ends of the frame become worn this block can be moved back, so as to rest against box $C^9$, and thereby take up the lost motion caused by wear.

D represents the main shaft, and D' the cog keyed thereon.

$D^2$ is a small cog, worked on a pin, $D^6$, projecting from an arm or lever, $D^5$, which has a bearing on the main shaft.

$D^3$ are teeth on a curved frame, and $D^4$ a guard on said frame. The arm $D^5$ is provided with a spring and dog, the latter engaging the teeth and securing the arm in any desired position.

E is a cross-bar having a bearing under the rear frame, $C^3$ $C^4$. To this cross-bar is rigidly secured the cog E'. By throwing the lever $D^5$ backward, as shown in Fig. 3, the gearing $D^2$ and E' are engaged and power communicated through the main shaft D and cog D' to the several parts.

By placing the lever $D^5$ in a vertical position the cog $D^2$ is disengaged from cog E', and the several parts thereby thrown out of gear.

This handle being convenient to the driver, it will be seen that he can easily throw the machine in and out of gear. F indicates a cross-bar having a bearing under the rear ends of the frame-pieces $C^3$ and $C^4$. On either side of this cross-bar is a right-angled arm, F', having an outer horizontal threaded projection, $F^2$. This projection is provided with nuts $F^3$ $F^3$.

$F^4$ is a hooked arm, rigidly united to cross-piece F. When the parts are thrown out of gear and the lever P thrown forward the beams and plows are raised. The hooked arm $F^4$ is thereby thrown forward, the hook engaging and forcing down the forward end of the handle K. By this means, through the medium of the mutilated pinion and rack, the operator is enabled to cause the racks to lie together and thereby elevate the rear ends of the handles sufficiently to prevent them from engaging the ground—that is to say, by throwing down the forward end of handle K, when it is raised, it will force its rack-bar down on the pinion, and the two racks will be caused to lie side by side, whereby the handles will be parallel and the rear ends thereof carried clear of the ground. By forcing down the forward ends of the handles the rack-bars are also pressed downward and the hoes $J^3$ and $K^3$ lifted and carried clear of the ground.

G G are the mold-boards, right and left, and G' G' the beams, hinged to the rear end of frame C C. (Shown in dotted lines, Fig. 1.)

H is the right-hand rack-frame, and H' the left-hand one.

I is a mutilated pinion, keyed to cross-bar E. This pinion has teeth nearly half-way around, the other part being smooth. When the machine is in gear the main shaft imparts power through the chain of gearing to the cross-bar E, and consequently the mutilated pinion I is revolved. It will be seen that a half-revolution of said pinion will suffice to engage the teeth on the inside of the rack-bar, (shown in Figs. 2 and 5,) and move said bar downward. When the pinion has completed its downward movement its teeth will engage the teeth in the rack on the opposite side of the casing and force the rack upward. The two racks H and H' are so adjusted on the shaft E that they are given an alternate reciprocating motion.

J J are vertical standards on the tops of racks H H'.

J' is the right-hand hoe-handle, pivoted at $J^2$ to a standard on $C^5$.

$J^3$ is a patting-hoe on the rear end of handle J'.

K is the left-hand hoe-handle, pivoted to the standard J at its forward end and to the standard $K^2$ at the rear. The alternate reciprocating motion which is given to the rack-boxes H H' by the mutilated pinion is communicated to the hoe-handles J' and K. By this means a similar motion is imparted to the hoes $K^3 J^3$. The hoe $K^3$ forms the hills and gives to each a corresponding shape. It has a wave-like motion. The hoe $J^3$, having the alternate motion, descends on each of the hills formed by hoe $K^3$ and pats or presses the same immediately on its top, thereby imparting shape to the hills. It will be seen that these hoes will operate in the center of the ridge thrown up by the shovels G G.

The hopper is represented by the letter L.

M is a cut-off on the bottom of an arm. (Shown in dotted lines of Fig. 4.)

M is a plate, adjustable horizontally in the hopper. The inner end of this plate is adapted to admit a small or large quantity of fertilizer through the opening in the bottom of the hopper.

$M^2$ is a pin to secure the cut-off plate.

N is an arm passing through the top of the hopper. It is provided with a right-angled projection that passes through a staple, $N^2$, of the rack-box H'.

O O are shoulders on the inside of the hopper, that secure a downward-projecting arm, O', and cross-piece $O^2$, designed to stir the fertilizer. Said shoulders are secured to the arm N.

$O^3$ is the opening in the bottom of the hopper, through which the fertilizer passes.

N' is a set-screw adapted to secure the cut-off M in any desired position. When the cut-off is thrown forward to the position shown in Figs. 2 and 4, it is adjusted to drop the fertilizer at various points—that is to say, it opens and closes the lower opening in the hopper. When, however, the cut-off is thrown back, which can be done by adjusting the arm of said cut-off on the arm N by the set-screw N', the fertilizer is permitted to drill or pass freely through the opening $O^3$ in the hopper.

P is a lever having dog Q, that engages with teeth on the top of circular frame R. The bottom of this lever is rigidly fixed to the cross-piece F. By moving the lever forward the right-angled arms F' F' on the cross-piece F are raised. By raising these arms the beams and plows attached are also raised. By lowering said arms the plows are lowered. It will thus be seen that the depth of the furrows can be regulated by the lever P. Thus a vertical adjustment is given the plows by the lever, while said plows and their beams are adjustable laterally on the threaded arms $F^2 F^2$ by the nuts $F^3 F^3$. By the foregoing means it must be apparent that the width and depth of the furrow can be adjusted to suit the convenience of the operator.

S, Fig. 7, is a crescent-shaped hoe, adapted to be used, when desired, in place of hoe $J^3$. The forked hoe T (shown in Fig. 8) is also adapted to be attached to the handle J' in place of hoe $J^3$.

It must be apparent by making the cog E' smaller a more rapid motion is given the cross-bar E and mutilated pinion, and thereby a quicker motion is imparted to the handles K and J', and consequently a smaller hill formed. By making said cog larger a larger hill is formed.

The machine herein set forth is particularly adapted for making tobacco-hills. It is obvious that it may be used on other crops.

Having thus described my invention, I claim as new and desire to secure by Letters Patent—

1. The cross-bar F and its operating parts, in combination with the hooked arm $F^4$, adapted to force down the forward end of the handle K, substantially as described, and for the purposes set forth.

2. The rack-boxes H H', cross-piece E, pinion I, standards J J, and handles J' and K, pivoted to standards J and $J^2$, said standards having a series of holes therein, by means of which the stroke of the handles is regulated.

3. The frames C' C², provided with the slotted and adjustable block C⁶, in combination with the frame-pieces C³ C⁴, having the under boxes, C⁹, substantially as described, and for the purposes specified.

4. In a gang-plow, the hopper L, provided with opening O³, the mixing-arms O O' O², the adjustable cut-offs M' and M, the arm N, and set-screw N', in combination with the rack-box H, provided with staple N², substantially as described, and for the purposes set forth.

5. In a gang-plow, as herein set forth and described, the wheels A A' inside the line of the landside of the two shovels, respectively, said wheels moving freely on the main shaft D, and being provided with ratchets A² and pawls A³ A³, in combination with the frame-pieces B C C C' C², the pieces C' C² being lapped and hinged to the rear frame-pieces, C³ C⁴, the shaft D, having bearing immediately under the hinged frame end, and also having a bearing under the rear ends of frame C C, the frames C' C² each being provided on its under side with the slotted and adjustable block C⁶, substantially as described, and for the purposes set forth.

In testimony whereof I affix my signature in presence of two witnesses.

ROBERT W. ALLEN.

Witnesses:
J. C. TURNER,
M. V. SMITH.